United States Patent Office 3,321,366
Patented May 23, 1967

3,321,366
FUNGICIDAL METHODS AND COMPOSITIONS
Dorsey R. Mussell, Clare, and Henry Tolkmith, Midland, Mich., assignors to The Dow Chemical Company, Midland, Mich., a corporation of Michigan
No Drawing. Filed Nov. 15, 1965, Ser. No. 507,691
8 Claims. (Cl. 167—33)

The present invention is concerned with fungicidal methods employing, and compositions comprising, a tritylimidazole compound of the formula

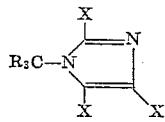

In the above and succeeding formulas, each R independently represents an aryl radical of the formula

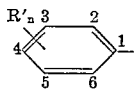

wherein each R' independently represents a member selected from the group consisting of halo and loweralkyl and $n$ represents an integer of from 0 to 2, both inclusive, further limited in that one of the 2 and 6 positions is unsubstituted; and each X independently represents hydrogen, loweralkyl, or phenyl, the total number of carbon atoms in all X substituents being an integer of from 0 to 15, both inclusive. In the present specification and claims, the term "loweralkyl" is employed to designate an alkyl radical being of from 1 to 4, both inclusive, carbon atoms, and the term "halo" to designate bromo, chloro, and fluoro, only.

The products to be employed in accordance with the present invention are liquids or crystalline solids. They are prepared in accordance with known procedures, in which a Group I metal imidazole salt of the formula

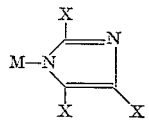

is reacted with a trityl halide reactant of the formula

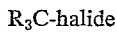

$R_3C$-halide

The Group I metal is preferably sodium or silver, and the halide, preferably chloride or bromide. The reaction is carried out in an inert liquid reaction medium, which is typically an organic liquid. Suitable organic liquids include hydrocarbons, such as hexane, cyclohexane, benzene, and toluene; and others, such as diethyl ether.

The reaction consumes the reactants in amounts representing equimolecular proportions, and the use of the reactants in amounts representing such proportions is preferred. The reaction goes forward at temperatures of from 20 to 100° C., with the production of the desired tritylimidazole compound and metal chloride byproduct. The reaction is often conveniently carried out at reflux.

The reaction is carried out by contacting the reactants, conveniently by adding one to the other in the reaction medium, and preferably with agitation of the resulting reaction mixture. Following the completion of the contacting, the reaction mixture can be permitted to stand, preferably with continued agitation, to complete the reaction. The byproduct is removed from the reaction mixture by filtration or by washing with water, and the reaction medium removed by evaporation to obtain the desired tritylimidazole product as a residue. The product residue can be employed in the practices of the present invention, or can be purified by recrystallization before being so employed.

Representative tritylimidazole products to be employed in the practice of the present invention include: the various 1 - (tris($x$ - tert - butylphenyl)methyl)imidazole products, including 1-(tris(o-tert-butylphenyl)methyl)-imidazole;
1-(tris(m-tert-butylphenyl)methyl)imidazole; and
1-(tris(p-tert-butylphenyl)methyl)imidazole;
1-(tris(2,4-diflourophenyl)methyl)-2,4,5-trimethylimidazole;
1-(tris(p-chlorophenyl)methyl)-2-methyl-4,5-diphenylimidazone;
1-(tris(m-tolyl)methyl)-2-n-propylimidazole;
1-trityl-4-(and 5)phenylimidazole;
1-(tris(3-bromo-5-ethylphenyl)methyl)-4(and 5)isopropyl-5(and 4)-phenylimidazole;
1-trityl-4-(and 5)-tert-butylimidazole; and
1-trityl-2-methylimidazole.

Representative unsymmetrical trityl products to be used in accordance with the present invention include 1-((m-tert-butylphenyl)bis(p - tert - butylphenyl)methyl)imidazone; 1-((o-tolyl)bis(p-tolyl)-methyl) - 2 - imidazole; 1-(phenylbis(p - chlorophenyl)methyl) - imidazole; and 1-(diphenyl(p-tert-butylphenyl)methyl)-imidazole.

It has been discovered that the tritylimidazole compounds are particularly adapted to be employed for the control of a wide range of fungi, especially those fungal organisms ordinarily found on the aerial portions of plants, such as, for example, cherry leaf spot, black spot, apple scab, rice blast, powdery mildew, Helminthosporium (leaf spot on grasses, cereals, and corn), and late blight. The compounds can also be applied in dormant applications to the woody surfaces of plants or to orchard floor surfaces for the control of the overwintering spores of many fungi. In addition, the tritylimidazole compounds can be applied to seeds to protect the seeds from the attack of fungal organisms such as rot and mildew. Also, the tritylimidazole compounds can be distributed in soil at fungicidal concentrations to control the organisms which attack seeds and plant roots, particularly the fungal organisms of root rot and mildew.

In further operations, the compounds can be included in inks, adhesives, soaps, cutting oils, polymeric materials, or in oil or latex paints, to prevent mold, mildew, and the degradation of such products resulting from microbial attack. Also, the compounds can be distributed in textile or cellulosic materials, or can be employed in the impregnation of wood and lumber to preserve and protect such products from the attack of the microbial agents of rot, mold, mildew, and decay. The foregoing environments are merely illustrative of the many habitats in which these agents can be distributed to obtain excellent fungal control.

It is an advantage of the present invention that compositions containing these compounds can be applied to growing vegetation in amounts required for effective control without significant injury to the plants. It is a further advantage that the compounds of the present invention are of very low toxicity to mammals. Also, it is an advantage that the tritylimidazole compounds are effective in eliminating established fungal infestation as well as in providing residual and extended control against fungal attack. Further, the tritylimidazole compounds have been found to be translocated in plants and thus it is an advantage of the present invention that the compounds provide a systemic protection against the plant attacking organisms. It is a yet further advantage that the tritylimidazole compounds can be handled with a minimum of danger from accidental mammalian toxicity.

The method of the present invention comprises contacting a fungal organism with a fungicidal amount of one or more of the tritylimidazole compounds. However, the present invention also embraces the employment of a liquid, powder or dust composition containing one or more of the compounds. Such compositions are adapted to be applied to living plants without substantial injury to the plants. In preparing toxicant compositions, the tritylimidazole compounds can be modified with one or more of a plurality of additaments including organic solvents, petroleum distillates, water or other liquid carriers, surface active dispersing agents, and finely divided inert solids. In such compositions, the tritylimidazole compounds oftentimes are present in a concentration from about 2 to 98 percent by weight. Depending upon the concentration in the composition in the tritylimidazole compound, such augmented compositions are adapted to be employed for the control of the undesirable fungi or employed as concentrates and subsequently diluted with additional inert carrier to produce the ultimate treating compositions. In compositions where the adjuvant or agent, the combination of a surface-active agent and a liquid additament, or, especially, the combination of a surface-active agent and an inert finely divided solid, the carrier cooperates with the active component so as to facilitate the invention, and to obtain an improved and outstanding result.

The expression "surface active dispersing agent," as herein employed, is intended to include all agents which are capable of acting at the interfacial surface between the tritylimidazole compound and water or other liquid medium, facilitating thereby the dispersion of the compound in the medium. The term is inclusive of solid emulsifying agents such as finely divided bentonite, pyrophyllite, fuller's earth, attapulgite, silica, other clays, and mineral carriers as well as liquid wetting and dispersing agents.

The term "inert finely divided solid," as herein employed, refers to materials whose primary function is not as dispersant of the tritylimidazole compounds in a liquid medium but as carrier for dust compositions. Representative such materials are chalk, talc, gypsum, powdered walnut shells, etc.

The exact concentration of the tritylimidazole compound employed in the compositions for application to the fungal organism and/or its habitat can vary provided a fungicidal dosage of toxicant is applied either on the organism or its environment. This dosage of toxicant is primarily dependent upon the susceptibility of the particular organism to the particular tritylimidazole compound employed. In general, good results are obtained with liquid compositions containing from about 0.0001 to 2.0 percent by weight of toxicant; in some operations, however, compositions containing as much as from 2 to 98 percent by weight are conveniently employed, as for example, in applications to orchard floor surfaces for the control of spores. With dusts, good results are usually obtained with compositions containing from 0.001 to 2.0 percent or more by weight of toxicant. In some circumstances, it is preferred to employ dust compositions containing as much as from 2 to 98 percent or more by weight of toxicant. In terms of acreage application, good controls of fungal organisms are obtained when the tritylimidazole compounds are applied to plots of growing plants at a dosage of from 0.004 to 3 or more pounds per acre.

In the protection and preservation of inks, adhesives, cutting oils, paints, textiles, and paper, good results are obtained when the compounds are incorporated in such products in the amount of at least 0.0001 percent by weight. In the preservation of wood, excellent results are obtained when the compounds are incorporated by conventional treatment in the wood in the amount of at least 0.0001 pound per cubic foot of wood.

In the preparation of dust compositions, an inert finely divided solid is ground or mixed with the toxicant or wet with a solution of the toxicant in a volatile organic solvent which is thereafter permitted to evaporate. Similarly, other dust compositions containing toxicant, inert finely divided solid, and a surface-active agent are prepared by grinding or mixing together such components. In these procedures, the various solid surface-active dispersing agents, such as fuller's earth, bentonite, attapulgite, and other clays, can be employed. Where the surface-active agent is a solid, simple mixing or grinding together of all components is usually sufficient. Where the surface-active agent is a liquid, the mixture of toxicant, inert finely divided solid, and surface-active agent is conveniently achieved by mixing or grinding together the toxicant and the inert finely divided solid and wetting the resulting mixture with the surface-active dispersing agent or with a solvent solution thereof. Depending upon the proportions of ingredients, these dust compositions can be employed for the control of fungi or employed as concentrates and subsequently diluted with additional carrier materials to obtain the desired amount of active ingredient in a composition adapted to be employed for the control of fungi. Also, such dust compositions, when employed as concentrates, can be dispersed in water, preferably with the aid of a dispersing agent where none is present in the dust composition itself, to form spray mixtures.

Further, the tritylimidazole compounds or a liquid or dust concentrate composition containing such compounds can be incorporated in intimate mixture with surface-active dispersing agents such as non-ionic emulsifying agents to form spray compositions. Such compositions are readily employed for the control of fungi or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray composition.

Similarly, the tritylimidazole products can be compounded with a suitable water-immiscible organic liquid and a surface-active dispersing agent to produce emulsifiable concentrates which can be further diluted with water and oil to form spray mixtures in the form of oil-in-water emulsions. In such compositions, the carrier comprises an aqueous emulsion, i.e., a mixture of water immiscible solvent, emulsifying agent and water. Preferred dispersing agents which can be employed in these compositions are oil-soluble and include the non-ionic emulsifiers such as the condensation products of alkylene oxides with the inorganic acids, polyoxyethylene derivatives of sorbitan esters, complex ether alcohols and the like. Suitable organic liquids which can be employed in the composition include petroleum oils and distillates, toluene, and synthetic organic oils. The surface-active dispersing agents are usually employed in liquid compositions in the amount of from 0.1 to 20 percent by weight of the combined weight of the dispersing agent and active compound.

When operating in accordance with the present invention, the tritylimidazole compounds or a composition containing the compounds can be applied to the fungal organisms to be controlled, or to their habitats in any convenient fashion, e.g., by means of hand dusters or sprayers. Applications to the above-ground portions of plants conveniently can be carried out with powder dusters, boom sprayers, high-pressure sprayers, and spray dusters. In foliar applications, the employed compositions should not contain any appreciable amount of phytotoxic diluents. In large scale operations, dusts or low volume sprays can be applied from airplanes.

In other operations, the tritylimidazole compounds can be dispersed in an atmosphere, particularly within a space temporarily or permanently enclosed such as a greenhouse, railroad car, or the like, to control fungal organisms therewithin, to protect contents exposed to the atmosphere, and to control airborne fungal organisms such as spores and the like. In these operations, a tritylimidazole compound can be placed upon a surface of which the temperature facilitates volatilization, at a desired rate, of the compound or composition containing the same into the atmosphere; also, in an alternate embodiment, a tritylimidazole compound can be used as an aerosol, that is, incorporated with a propellant and, if desired, a cosolvent, and the resulting composition released from a pressure container into the atmosphere.

The following examples illustrate the present invention.

*Example 1*

50 parts by weight of 1-tritylimidazole are mixed and ground with 18 parts of diatomaceous earth (Celite 209), 24 parts of a hydrous aluminum silicate (Barden Clay), 6 parts of an alkyl aryl sulfonate (Nacconol NRSF), and 2 parts of a substituted benzoic alkyl sulfonic acid (Daxad No. 27) to prepare a composition which can be used in accordance with the foregoing teachings. In a similar manner, other compositions are prepared by employing one of the following in place of the 1-tritylimidazole:

1-(tris(p-tolyl)methyl)imidazole;
1-(tris p-chlorophenyl)methyl)imidazole;
1-(tris(p-tert-butylphenyl)methyl)imidazole; and
1-trityl-2-n-propylimidazole.

Also, 90 parts by weight of 1-tritylimidazole and 10 parts by weight of a sorbitan monolaurate polyoxyethylene derivative (Tween 20) are mixed together to prepare another composition which also can be employed according to the foregoing teachings. In a similar manner, other compositions are prepared by employing one of the following in place of 1-tritylimidazole:

1-(tris(2,4-xylyl)methyl)-4(and 5)-phenylimidazole;
1-(tris(x-tert-butylphenyl)methyl)imidazole;
1-(tris(p-fluorophenyl)methyl)imidazole;
1-trityl-2-methylimidazole.

In other procedures, aqueous compositions are prepared by mixing and grinding together in a ballmill 0.06 part by weight of one of the tritylimidazole compounds, 0.06 part of an alkyl aryl sulfonate (Nacconol NR), 0.06 part of Daxad No. 27, and 200 parts of water.

These compositions are adapted to be employed for the control of fungi or to be dispersed in water to provide aqueous compositions having desirable wetting properties. The compositions are useful for the distribution of the compounds in fungicidal amounts.

*Example 2*

Four parts by weight of 1-tritylimidazole, 0.08 part of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid. A portion of this concentrate composition is dispersed in water to produce an aqueous spray composition containing 75 parts of the subject compound per million parts by weight of ultimate mixture. The resultant composition is sprayed with an atomizing spray nozzle using air pressure at 20 pounds per square inch on young potato plants which are about 6 inches tall. The applications are carried out so as to give thorough coverage of all surfaces of the leaves of the plants without appreciable run-off. Following the applications, the spray compositions are allowed to dry upon the leaf surfaces and the plants then inoculated by spraying with a suspension of viable spores of *Phytophthera infestans* (late blight). Untreated potato plants of the same maturity are similarly inoculated to serve as checks. Immediately following the inoculation, all plants are placed in a moist chamber and maintained at 70° F. under saturated humidity conditions for 24 hours. Thereafter, the plants are set aside under greenhouse conditions for about five days and observed for the development of the lesions of late blight caused by the Phytophthera organisms to determine the percent control of this organism.

Observation about one week following the inoculations shows substantially complete controls of *Phytophthora infestans* on the plants sprayed with the composition containing 1-tritylimidazole. At the time of the observations, the leaves of the untreated check plants are found to be heavily covered with lesions of *Phytophthora infestans*.

*Example 3*

Essentially the same results are obtained in the procedures of Example 2 when employing as sole active fungicidal agent, separately in place of 1-tritylimidazole, each of the following:

1-(tris(p-tolyl)methyl)imidazole;
1-(tris(p-chlorophenyl)methyl)imidazole;
1-trityl-2-n-propylimidazole;
1-(tris(2,4-xylyl)methyl)-4(and 5)-phenylimidazole;
1-(tris(p-tert-butylphenyl)methyl)-4(and 5)-tert-butylimidazole;
1-(tris(p-fluorophenyl)methyl)imidazole;
1-trityl-2-methylimidazole;
1-(tris(p-tert-butylphenyl)methyl)-4(and 5)-isopropyl-5(and 4)-phenylimidazole.

*Example 4*

Spray compositions each containing varying amounts of 1-tritylimidazole and each prepared according to Example 1 were employed for the control of *Erysiphe cichoracearum*, an organism causing powdery mildew on cucumber plants. In such operations, each spray composition was sprayed on cucumber plants through an atomizing nozzle using a pressure of 20 pounds per square inch. The applications were carried out so as to give thorough coverage of all surfaces of the plants. After the spray deposit had dried, the plants were inoculated with spores of *Erysiphe cichoracearum*. Untreated cucumber plants were similarly inoculated to serve as checks. After about 7 days in a greenhouse, the plants were observed for the development of powdery mildew. The concentrations in the spray compositions and the results of the observations are set forth in the following table.

| Parts of 1-tritylimidazole per million parts by weight of ultimate spray composition: | Percent kill and control of *Erysiphe cichoracearum* |
| --- | --- |
| 150 | 100 |
| 75 | 100 |
| 37 | 100 |
| 0 (check) | 0 |

*Example 5*

1-tritylimidazole was employed for the control of black spot fungus (*Diplocarpon rosae*) and powdery mildew (*Sphaerotheca panossa*) on rose plants of various varieties. All of the rose plants were situated in a field plot and were exposed to natural infestation by black spot fungus and powdery mildew. The plants were divided into two groups; one of the groups was left untreated throughout the evaluation procedures to serve as a control. The other group of rose plants was treated at weekly intervals with a spray composition comprising 300 parts by weight of 1-tritylimidazole per million parts by weight of ultimate composition. The composition was applied by spraying using a pressure of about 40 pounds per square inch. The application was carried out so as to give thorough coverage of all surfaces of the plants of the treated group.

The operations were continued for a period of about 2 months. During this time, the treated plants were subject to natural reinfestation by black spot fungus and powdery mildew from the neighboring plants of the control group, as well as from other neighboring vegetation. At the end of the two month period, all plants were examined for the presence of *Diplocarpon rosae* and

*Sphaerotheca panossa.* An average infection index, ranging numerically from zero for a total absence of signs of fungal infection to 100 for the most severe fungal infection, was determined for each variety of rose in the treated group and in the control group. The results of these determinations are set forth in the following table.

Average Infection Index

| Variety of Rose | Plants treated with 1-tritylimidazole | | Control Plants | |
| --- | --- | --- | --- | --- |
| | *Diplocarpon rosae* | *Sphaerotheca panossa* | *Diplocarpon rosae* | *Sphaerotheca panossa* |
| Crimson Glory | 27 | 23 | 62 | 74 |
| Chrysler Imperial | 10 | 13 | 46 | 66 |
| Charlotte Armstrong | 7 | 3 | 28 | 34 |
| Peace | 30 | 0 | 80 | 20 |

The Group I metal imidazole salts employed in the preparation of the products to be used in accordance with the present invention are prepared in known procedures wherein a Group I metal nitrate is reacted with an imidazole compound of the formula

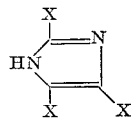

The reaction is conveniently carried out in a reaction medium, preferably water, and in the presence of a neutralizing agent, typically sodium hydroxide. The reaction consumes the reactants in amounts representing equimolecular proportions of metal nitrate, imidazole compound, and sodium hydroxide, and the use of the materials in amounts representing such proportions is preferred. The reaction goes forward readily at temperatures of a wide range, but is conveniently conducted at room temperature. The reaction results in the production of the desired metal imidazole salt and byproduct water and sodium nitrate.

All of the trityl halide reactants employed in the preparation of products to be used in accordance with the present invention are prepared in procedures well known for the preparation of the unsubstituted trityl chloride. This synthesis, a type of Friedel-Crafts reaction, comprises the reaction of an aromatic compound of the formula

RH with carbon tetrachloride in the presence of a catalytic amount of aluminum chloride. In general good results are employed when utilizing the materials in amounts which represent a proportion of 1 part of carbon tetrachloride, 3.5 parts of RH reactant, and 1.25 parts of aluminum chloride. Conditions and procedures for carrying out the reaction are well known. Where R represents a substituted phenyl moiety, the reaction in some instances yields isomeric mixtures; these can be employed directly in the process of the present invention or can be purified before being so employed. When desired, equal amounts of two or three nonidentical RH materials can be employed to achieve other mixtures which can similarly be employed directly or purified.

We claim:

1. Method which comprises contacting a fungal organism with a fungicidal amount of a tritylimidazole compound of the formula

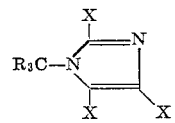

wherein each R independently represents aryl of the formula

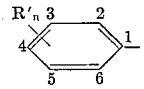

wherein each R' independently represents halo or loweralkyl and $n$ represents an integer of from 0 to 2, both inclusive, further limited in that one of the 2 and 6 positions is unsubstituted; and each X independently represents hydrogen, loweralkyl, or phenyl, the total number of carbon atoms in all X substituents being an integer of from 0 to 15, both inclusive.

2. Method of claim 1 wherein the tritylimidazole compound is 1-tritylimidazole.

3. Method of claim 1 wherein the tritylimidazole compound is 1-(tris($x$-tert-butylphenyl)methyl)imidazole.

4. Method of claim 1 wherein said tritylimidazole compound is employed in the form of a composition comprising said compound in intimate admixture with a parasiticide adjuvant as a carrier thereof.

5. A fungicidal composition comprising from 2 to 98 percent by weight of a tritylimidazole compound in intimate admixture with an inert finely divided solid, said tritylimidazole compound being of the formula

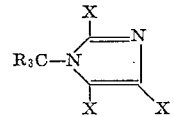

wherein each R independently represents aryl of the formula

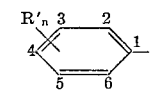

wherein each R' independently represents halo or loweralkyl and $n$ represents an integer of from 0 to 2, both inclusive, further limited in that one of the 2 and 6 positions is unsubstituted; and each X independently represents hydrogen, loweralkyl, or phenyl, the total number of carbon atoms in all X substituents being an integer of from 0 to 15, both inclusive.

6. A fungicidal composition comprising an inert finely divided solid, a surface-active dispersing agent, and a tritylimidazole compound of the formula

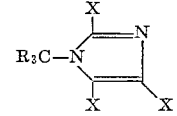

wherein each R independently represents aryl of the formula

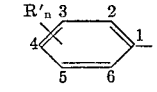

wherein each R' independently represents halo or loweralkyl and $n$ represents an integer of from 0 to 2, both inclusive, further limited in that one of the 2 and 6 positions is unsubstituted; and each X independently represents hydrogen, loweralkyl, or phenyl, the total number of carbon atoms in all X substituents being an integer of from 0 to 15, both inclusive.

7. Composition of claim 6 wherein the tritylimidazole compound is 1-tritylimidazole.

8. Composition of claim 6 wherein tritylimidazole compound is 1 - (tris(x-tert-butylphenyl)methyl)imidazole.

References Cited by the Examiner

Chem. Abst. 53, pp. 10190–10191 (1958).
Chem. Abst. 54, pp. 15368–15369.

ALBERT T. MEYERS, *Primary Examiner.*
STANLEY J. FRIEDMAN, *Assistant Examiner.*

UNITED STATES PATENT OFFICE
CERTIFICATE OF CORRECTION

Patent No. 3,321,366　　　　　　　　　　　　　　　　May 23, 1967

Dorsey R. Mussell et al.

It is hereby certified that error appears in the above numbered patent requiring correction and that the said Letters Patent should read as corrected below.

Column 1, line 54, for "others" read -- ethers --; column 2, lines 13 and 14, for "diphenylimidazone" read -- diphenylimidazole --; lines 24 and 25, for "imidazone" read -- imidazole --; column 3, line 21, after "or" insert -- helper is an inert finely divided solid, a surface-active --; column 9, line 7, for "wherein" read -- wherein the --; column 10, line 3, after "15368-15369 " insert -- (1959) --.

Signed and sealed this 18th day of June 1968.

(SEAL)

Attest:

Edward M. Fletcher, Jr.

Attesting Officer

EDWARD J. BRENNER

Commissioner of Patents